United States Patent
Gunnoe et al.

[11] Patent Number: 5,746,394
[45] Date of Patent: May 5, 1998

[54] METHOD AND APPARATUS FOR DAMPING HIGH FREQUENCY VIBRATIONS GENERATED BY LANDING GEAR BRAKE APPLICATIONS

[75] Inventors: Lowell G. Gunnoe, Carnation, Wash.; Hideo Kawada, Loa Angeles, Calif.; Philip C. Nutting, Bellevue, Wash.

[73] Assignee: The Boeing Company, Seattle, Wash.

[21] Appl. No.: 814,853

[22] Filed: Mar. 11, 1997

Related U.S. Application Data

[63] Continuation of Ser. No. 405,050, Mar. 15, 1995, abandoned.

[51] Int. Cl.[6] .................................................. B64C 25/46
[52] U.S. Cl. ........................................ 244/111; 244/103 R
[58] Field of Search ........................... 244/100 R, 103 R,
244/111; 188/22, 2 A, 181 T, 19 S, 134;
267/196, 199

[56] References Cited

U.S. PATENT DOCUMENTS

| | | |
|---|---|---|
| 1,598,228 | 8/1926 | Wikander . |
| 1,656,279 | 1/1928 | Kreissig . |
| 2,904,136 | 9/1959 | Greenough ........................ 244/111 |
| 2,943,820 | 7/1960 | Westdorf ........................ 244/103 R |
| 3,073,585 | 1/1963 | Hanle . |
| 3,171,641 | 3/1965 | Johnson . |
| 3,845,919 | 11/1974 | Jenny ........................ 244/103 R |
| 4,296,897 | 10/1981 | Thompson ........................ 244/111 |
| 4,428,565 | 1/1984 | Stiefel et al. . |

OTHER PUBLICATIONS

Preliminary Experiments on Active Control of Fan Noise From a JT15D Turbofan Engine, Thomas et al.

Primary Examiner—Galen L. Barefoot
Attorney, Agent, or Firm—Conrad O. Gardner

[57] ABSTRACT

Adjacent wheel brake assemblies on aircraft multi-wheel landing gear are interconnected by a ring spring damped brake rod for torque compensation and to provide the added function of vibration damping.

3 Claims, 2 Drawing Sheets

METHOD AND APPARATUS FOR DAMPING HIGH FREQUENCY VIBRATIONS GENERATED BY LANDING GEAR BRAKE APPLICATIONS

This application is a continuation of prior application Ser No. 08/405,050 filed Mar. 15, 1995, now abandoned.

BACKGROUND OF THE INVENTION

The present invention relates to vibration damping on aircraft landing gears and more particularly vibration damping generated by landing gear brake applications.

Prior attempts have been made to damp out brake induced vibrations by changing the brake rod frequency e.g. using a solid brake rod or a hollow brake rod with a layer of damping material bonded to the outside diameter of the rod (constrained layer damping). However, testing of such proposed configurations has not supplied sufficient damping.

PRIOR ART LITERATURE

U.S. Pat. No. 1,598,228 to Wikander shows a spring device in which outer rings 8 and inner rings 9 are nested together to create a spring damping device which allows for long travel and has large work absorbing capacity per unit of weight or volume.

U.S. Pat. No. 1,656,279 to Kreissig discloses a shock absorbing device in which a compression ring spring unit having inner and outer ring springs B and C respectively is provided.

U.S. Pat. No. 3,073,585 to Hanle pertains to an annular spring where interior rings 1 made of steel are interposed with exterior rings 3.

U.S. Pat. No. 3,171,641 to Johnson relates to a ring spring having outer rings A and inner rings B which consist of a spiral coil spring formed of spring metal strip wound into a desired number of abutting convolutions.

U.S. Pat. No. 4,428,565 to Stiefel et al. shows an arrangement for resilient absorption of forces where multiple inner rings 1 are interposed with multiple outer rings 2 and are arranged in a housing having parts 8 and 9 to protect the friction springs from dust and moisture. Pressure cups 6 are connected with one another by a centrally threaded member 5 to contain the spring unit.

SUMMARY OF THE INVENTION

Accordingly, it is an object of the present invention to provide apparatus for damping high frequency vibrations generated by landing gear brake applications.

It is a further object of the present invention apparatus for providing torque compensation and the further function of vibration damping in aircraft landing gears.

It is yet another object of the present invention to provide apparatus for interconnecting adjacent wheel brake assemblies in multi-wheel landing gear to provide vibration damping wherein the apparatus can be pre-loaded to set a damping threshold.

In accordance with a preferred embodiment of the present invention a ring spring damped brake rod is interconnected between adjacent wheel brake assemblies on an aircraft multi-wheel landing gear.

DESCRIPTION OF THE PREFERRED EMBODIMENT

Figure 1:
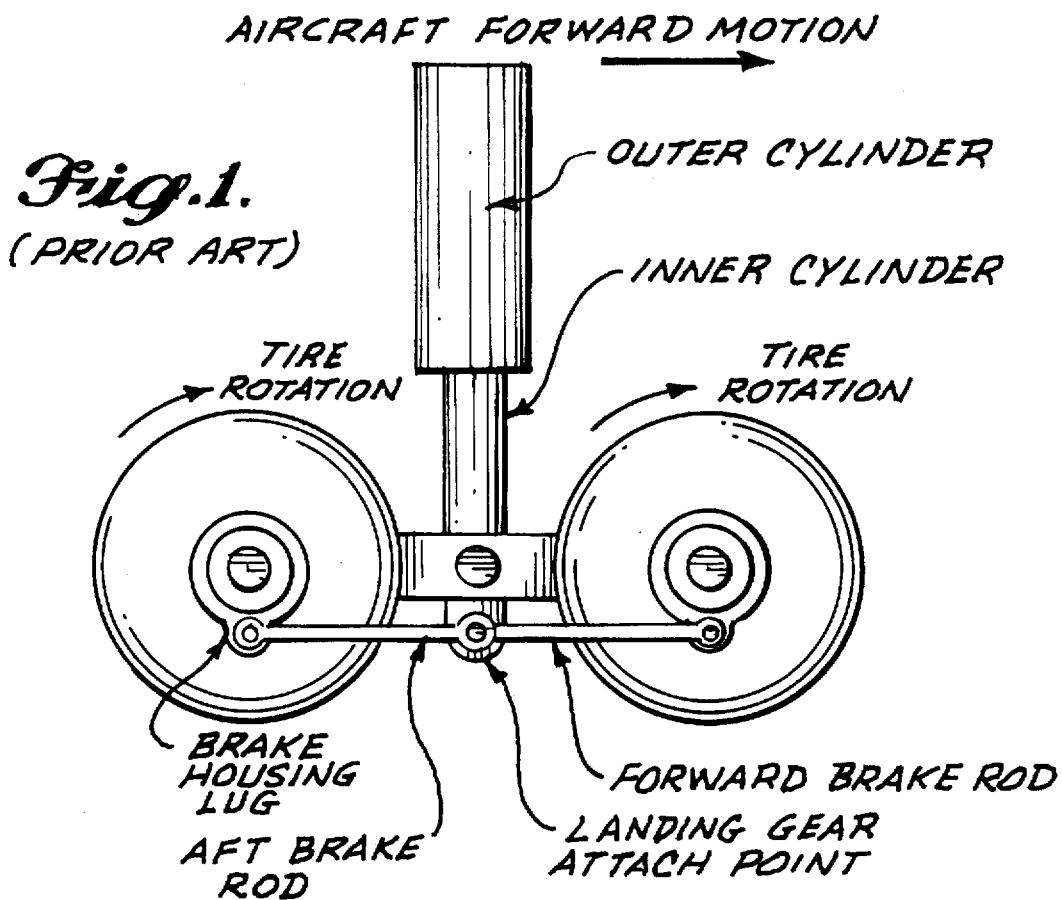
FIG. 1 is illustrative of a prior art four-wheeled landing gear.
Figure 2A:
FIG. 2A. is a plan view of a brake rod shown in FIG. 1.
Figure 2B:
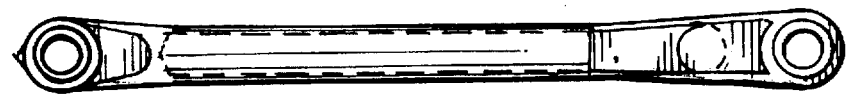
FIG. 2B. is a side view of the brake rod shown in FIG. 2A.
Figure 3:
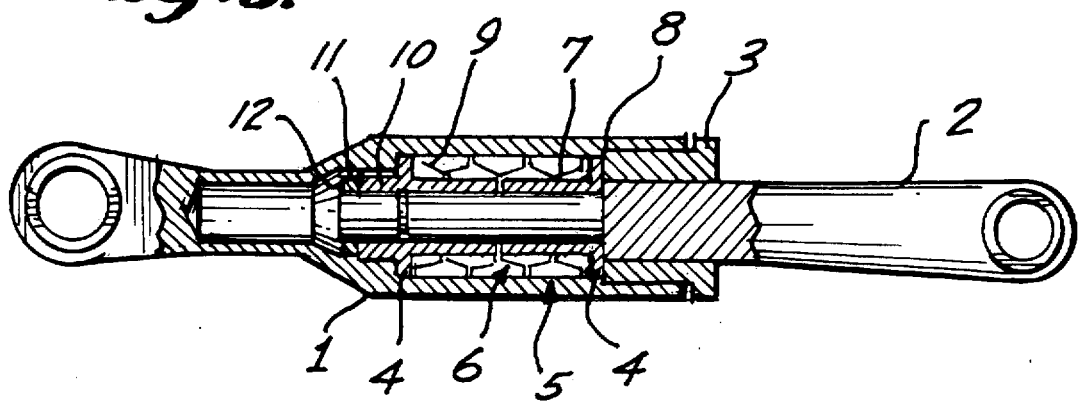
FIG. 3 is a side view of a brake rod according to the preferred embodiment of the present invention; and, FIG. 4 is a diagram showing the hysteresis loop for the brake rod shown in FIG. 3.

The present double acting ring spring brake rod assembly is activated when subjected to either tension or compression loading by the brake generated vibrations with the resulting energy being dissipated by the spring segments.

During a right to left compression stroke, with the housing 1 fixed, shaft 2 moves to the left which in turn moves the right hand buffer spool 4 to the left compressing the spring assembly. The spring compression load is reacted by the left hand buffer spool 4 which is bottomed on the housing 1. As the spring assembly is compressed, the wedging action causes the inner rings 6 and 7 to contract while the outer rings 5 expand. Removal of the load allows the spring assembly to recoil and return to its neutral position.

The work to load the spring assembly is greater than unloading since the friction force is additive to the elastic force on compression, but is subtractive from the elastic force on extension. The difference in work accounts for the energy dissipated in the cycle.

During a left to right compression stroke, again with the housing 1 fixed, the shaft 2 moves to the right moving the left hand buffer spool 4 to the right by the tension nut 10 threaded on the end of the shaft. The tabbed lock washer 11 and the jam nut 12 eliminate any tendency for the tension nut 10 to back off. The spring compression load is reacted by the right hand buffer spool 4 which is bottomed on the shaft guide 3 which is assembled and lock wired to the housing 1.

The mechanism for energy dissipation in the left to right stroke is identical to the right to left, the direction of motion being the only difference.

The present spring assembly can be pre-loaded to a desired level by tightening the tension nut 10 on the shaft 2. This sets a threshold at which the spring assembly will act as an energy absorber.

The working stroke is controlled by contact of the two buffer spools 4 using shim washer(s) 9 to compensate for manufacturing tolerances.

To ensure the spring assembly is snug in the housing, but not loaded beyond the pre-load to establish the working threshold of the spring assembly when the shaft guide 3 is installed, shim washers 8 are used. The dimension from the land of the housing 1 which mates with the left hand buffer spool 4 to the right hand face of shim washer(s) 8 must be equal to or slightly less than the dimension across the outside faces of the left and right hand buffer spools 4.

What is claimed is:

1. In combination in an aircraft multi-wheel landing gear having adjacent wheel brake assemblies:

a brake rod assembly interconnected between said adjacent wheel brake assemblies for providing torque compensation and vibration damping; and a brake rod assembly comprising a double acting ring spring brake rod assembly, wherein said double acting ring spring brake rod assembly is activated when subjected to either tension or compression loading by brake generated vibrations.

Figure 4:
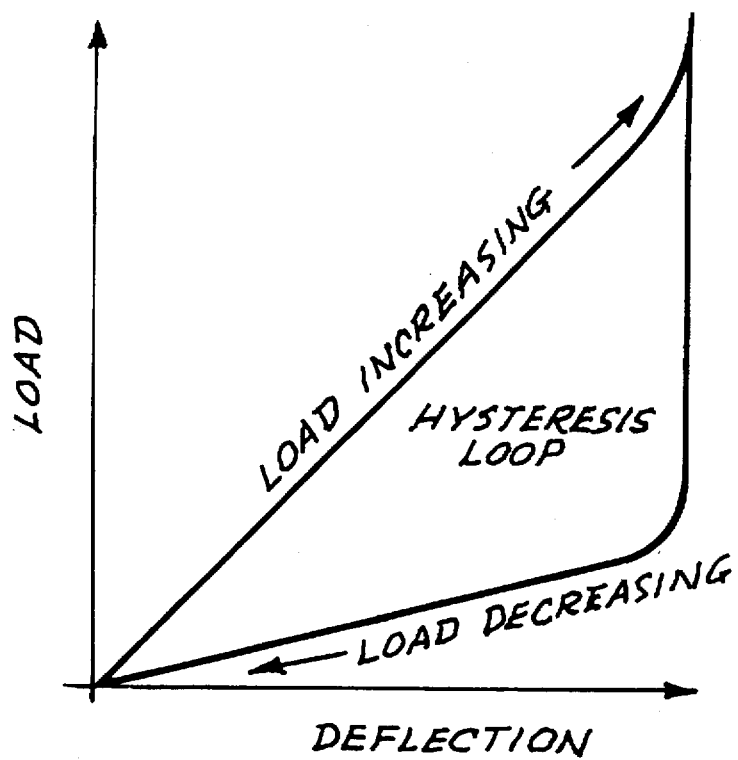

2. In combination in an aircraft multi-wheel landing gear having adjacent wheel brake assemblies:

a brake rod assembly interconnected between said adjacent wheel brake assemblies for providing torque compensation and vibration damping, wherein said brake rod assembly has a hysteresis loop as shown in FIG. 4.

3. The combination of adjacent wheel brake assemblies on an aircraft multi-wheel landing gear interconnected by a ring spring damped brake rod for torque compensation and for providing the added function of vibration damping.

* * * * *